United States Patent Office 3,473,035
Patented Oct. 14, 1969

3,473,035
DOCUMENT TRANSPORT AND REGISTRATION SYSTEM USING PHOTOCELLS
John F. Gardner, Penfield, and Thomas B. Michaels and Gordon P. Taillie, Rochester, N.Y., assignors to Xerox Corporation, Rochester, N.Y., a corporation of New York
Filed Apr. 21, 1967, Ser. No. 632,658
Int. Cl. G01n 21/30
U.S. Cl. 250—219          8 Claims

ABSTRACT OF THE DISCLOSURE

A document transport system wherein a transport belt of suitable optical qualities and bearing at least one slot or aperture is driven around two spaced rollers. This belt is held uniformly in movable contact with an apertured vacuum manifold in the area of an exposure zone. At an input to this zone an electrostatic tacking device is positioned relative to the moving belt to tack documents to its surface after the documents are positioned on this belt to partially cover the slot therein. Additionally, the drive source for the belt is controlled between two speeds by two photocells positioned inside the path of the belt and relative to the slot to sense the successive movement of the document covering this slot and to stop the exposure transport to register the document precisely in the exposure zone.

BACKGROUND OF THE INVENTION

This invention relates to transport systems for sheet material generally, and, more specifically to original document transport systems in duplicating apparatus.

Presently, duplicating apparatus are widely used to make multiple copies of a series of original documents. In every instance, speed and accuracy of reproduction are two significant factors constantly being improved upon.

With the higher speeds and quality resolution possible with present technologies in the copying technique itself, a limiting factor affecting these two aspects of the apparatus may be traced to the system which manipulates the original documents before and after duplication.

In most high speed duplicators, automatic document feed is a very desirable, if not essential, feature, for without it the speed afforded by the duplicating process itself, such as flash exposure and xerographic processing, would be compromised by the manual manipulations by the operator.

In such high speed automatic duplicators, a transport system preferably should be provided to receive individual documents from a document feeder and convey each one rapidly to an exposure zone, for example, where the document may be flash exposed as many times as necessary. This position in the exposure zone must be precise to insure proper alignment of the image on a copy sheet. This requirement for precise positioning is more significant in those situations, for example, where the image will be reduced three times or more for application on automatic data processing cards for later mechanized retrieval.

Physically, the document supporting surface of the transport in the exposure zone of the apparatus should be as flat as possible to insure that a document on this surface will lie in the usually shallow depth of field of the duplicating lens which focuses the document image onto a light-sensitive receptor.

This physical condition of the transport has been maintained by the prior art through the use of multi-roller transport systems wherein one roller is spring loaded to tension the usually heavy rubber transport belt thereby maintaining the desired flatness.

This technique has suffered, however, in the area of handling a series of different types of documents, such as those which are not always inclined to lay flat on the surface of the belt, e.g., previously folded documents or crinkled onion-skin documents. To overcome this, since electrostatic tacking has limited efficacy on thick insulating surfaces, the prior art has utilized vacuum transport systems. Under the influence of vacuum suction, the documents not inclined to lay flat naturally because of a prior folded condition are maintained flat against the belts of the document transport.

However, these vacuum systems have undesirable aspects in performance. If a document is placed under the influence of a vacuum suction originating along the longitudinal space between the belts and parallel to the direction of movement, the document will maintain its relation to the sources of suction throughout its advancement along the transport path. This means that if a crinkled onion-skin document is conveyed and its crinkles are parallel to the areas of suction, the crinkles will be preserved while the document, as a whole, is "flat" with the moving belts. If the crinkles are significant, then those crinkled areas existing between sources of suction may be outside the depth of field of the lens system employed thereby distorting the copies.

Furthermore, in the case of a vacuum transport as well as the uniform thick rubber belt, the background seen through a thin, almost translucent, onion-skin document by the light-sensitive receptor is objectionable. This background may include the dark vacuum ports and/or the usually dark rubber belt or belts. Unfortunately, a compromise in the quality of reproduction must be endured when using prior art transport systems.

Additionally, the heavy rubber belt used with tensioned rollers also serves to create a serious belt tracking problem when the belt's width-to-length ratio becomes too great as it does in the case of standard letter size documents. This necessitates expensive and complicated tracking correction methods.

SUMMARY

The transport system of the present invention provides for the rapid advancement of any type of document to be reproduced to a precise position in an exposure zone in a uniformly flat condition relative to a single continuous transport belt. The transport belt is stopped appropriately to consistently register the document with the exposure optical system to insure a high quality and complete copy. The nature of the transport belt is such as to afford the minimum of background while also obviating tracking correction.

Therefore, it is an object of the present invention to improve document transport systems.

It is another object of the present invention to provide rapid and accurate registration of a document to be copied in an exposure zone of a duplicating apparatus.

These and other objects which may become apparent are accomplished in accordance with the principles of the present invention wherein a transport belt of suitable optical qualities and bearing at least one slot or aperture is driven around two spaced rollers. This belt is held uniformly in movable contact with an apertured vacuum manifold in the area of an exposure zone. At an input to this zone an electrostatic tacking device is positioned relative to the moving belt to tack documents to its surface after the documents are positioned on this belt to partially cover the slot therein. Additionally, the drive source for the belt is controlled between two speeds by two photocells positioned inside the path of the belt and relative to the slot to sense the successive movement of the document covering this slot and to stop the exposure transport to register the document precisely in the exposure zone.

BRIEF DESCRIPTION OF THE DRAWINGS

For a better understanding of the invention as well as other objects and further features thereof, reference may be made to the following detailed description of the invention to be read in connection with the accompanying drawings wherein:

FIGURE 1 presents a sectional view of the document path from a document feeder 200 to a document stacker 175. The feeder may be of any conventional design and, for example, may be of a deisgn as disclosed in copending application Ser. No. 632,793 filed concurrently herewith in the name of Klaus K. Stange, Adalbert A. Lux, and Thomas B. Michaels.

Figure 1:
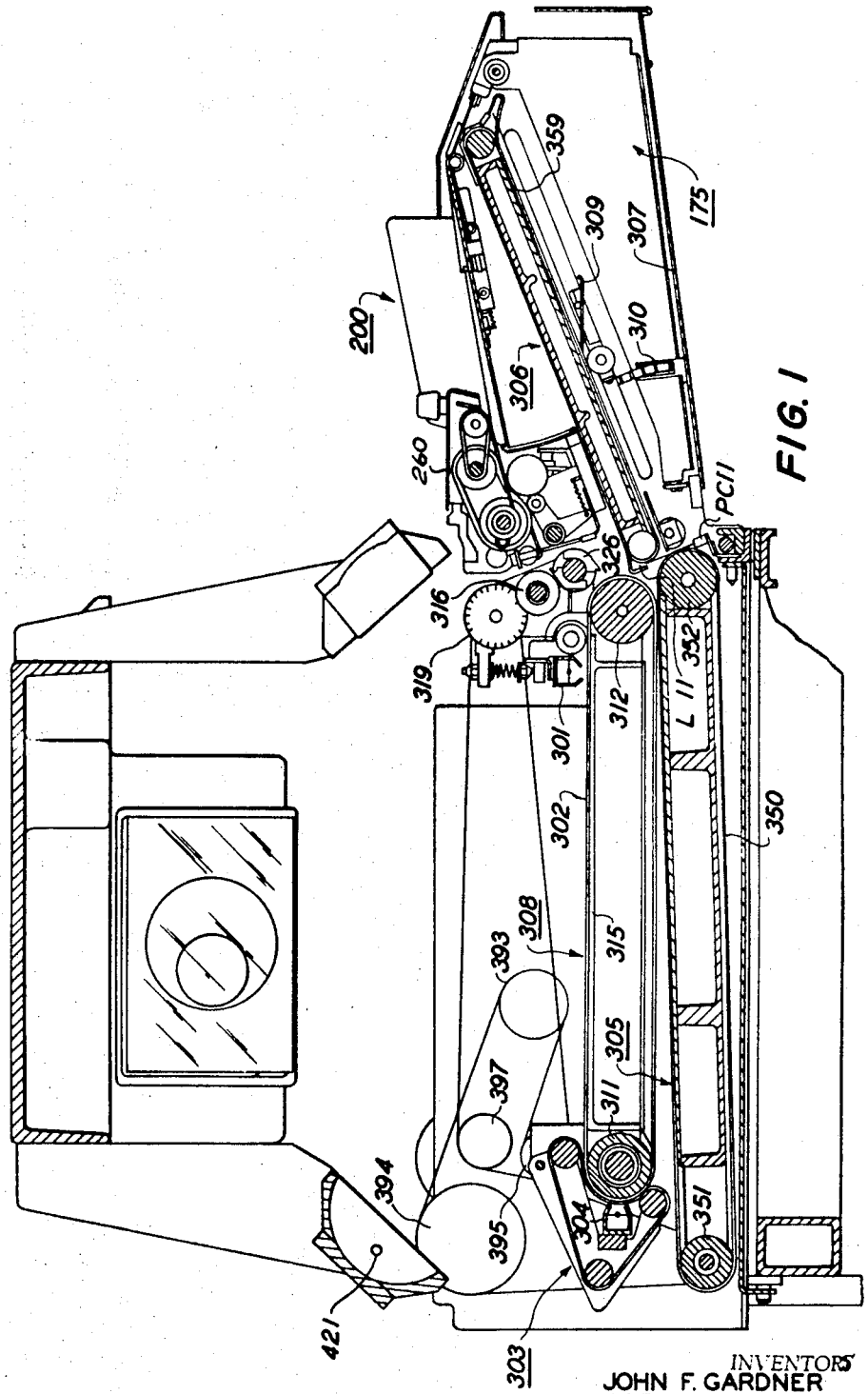
FIGURE 1 is a sectional view of an entire document transport system in which the present invention may be utilized.

The documents placed in the document feeder 200 are urged toward feed roller 316 by a separator feed belt 260 in the feeder itself. A document registration gate 326 is positioned as shown in FIG. 1 at the output of the feeder to selectively obstruct passage of the document past the feed roller 316. When the document registration gate is down, it is in a position to permit passage of the document past the feed roller. The document is then advanced under an electrostatic tacking device such as a conventional corotron 301 as shown in FIG. 1.

The results of the tacking corotron is to electrostatically adhere the document onto the exposure transport 308 and specifically onto the insulating exposure transport belt 302 which draws the document from the feed roller 316 into an exposure zone which substantially lies between the tacking corotron 301 and a turn-around assembly generally designated by reference numeral 303 located at the other end of the exposure transport.

The document adhering to the surface of the exposure transport belt 302 is then conveyed to an exposure zone at which time the exposure transport belt is stopped and the document is, for example, flash exposed by exposure lamps.

After exposure the exposure transport is started again and the document enters the turn-around assembly where a suitable de-tacking device shown as a conventional corotron 304 is employed to neutralize the electrostatic charge which attracts the document to the surface of the exposure transport belt.

The document, still under the influence of the turn-around assembly 303, leaves the turn-around area and is now free to be attracted by the suction of the second transport system 305 which employs a vacuum manifold. This transport system, referred to as a return transport, returns the document to a position adjacent the other end of the exposure transport where the document leaves the return transport and is guided into the influence of a third transport system, referred to as the stacker transport, which advances the document into the stacker.

The stacker 175 will receive the document from the stacker transport 306 after stripper fingers 309 urge the advancing document away from the vacuum influence of the stacker transport. As the trailing edge of the document is broken from the vacuum, the document copied will lie face down on the stacker tray 307. The stacker tray itself is inclined so as to permit documents to slide back toward the return transport. This sliding effect is desirable to permit an orderly stack of documents to be formed in the stacker area. However, because of the fact that documents varying in size may be desired to be copied, a backing assembly generally designated by reference numeral 310 is employed to prevent the documents from sliding to the end of the stacker tray remote from the front of the apparatus. This effectively keeps the documents copied in an orderly stack at the front of the stacker tray readily accessible to the operator.

Also illustrated in FIG. 1 is part of the drive chain system for the exposure and return transports as well as feed roller 316 and the registration gate 326. A main drive sprocket wheel 393 is mechanicaly coupled with a drive chain to idler sprockets 394 and 395 and conveyor roller 351 to provide continuous motive power to the return transport 305. Feed roller 316 is driven by gear 319 coupled via wheel 397 to a sprocket wheel (not shown) which is fixed to the same shaft associated with sprocket wheel 395.

Reference will now be made to FIGS. 3, 4, 5, and 6 which show in detail the exposure and return transports 308 and 305, respectively, in addition to the turn-around assembly 303, feed roller 316, and document registration gate 326.

An endless exposure transport belt 302 is supported and driven by two conveyor rollers 311 and 312 which are mounted on shafts 313 to permit the belt 302 to be driven along a predetermined path. A portion of this predetermined path is directly above the ports 314 in vacuum manifold 315. These ports are present in the portion of the vacuum manifold 315 coextensive with the area of the belt's path referred to as the exposure zone.

The exposure transport belt is formed of an insulating material and has a very reflective surface which is white or optically neutral in appearance. In a position substantially equidistant from the edges of the belt there is an elongated opening or slot 345 having its longer dimension parallel to the edges of the belt. The purpose of this slot will be described hereinafter.

At the input edge of the exposure transport there is located a tacking corotron 301. This corotron is mounted on a support member 317 which also supports a sprocket wheel 318 fixed to gear 319. Fixed to rotate with gear 319 is a power shaft 320 translating the power applied at sprocket wheel 318 to a solenoid-operated indexing clutch represented generally by reference numeral 321.

The indexing clutch 321 selectively translates power from the power shaft 320 through gear 322 and idler gear 323 to gear 324.

Idler gear 323 may be mounted on bearings to permit shaft 325 to rotate freely or this idler gear may be made of a suitable material, such as nylon, to permit shaft 325 to rotate freely through the idler gear without driving the gear itself.

Figure 5:
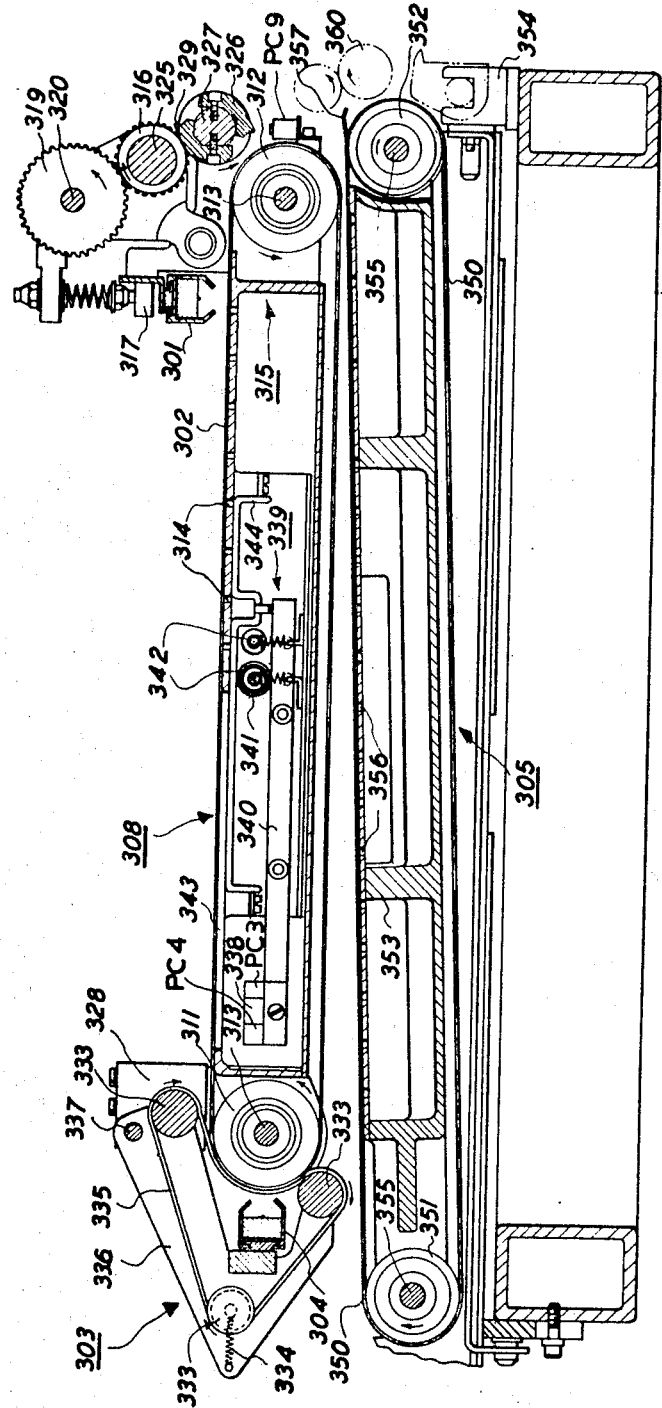
FIGURE 5 is a sectional view taken along sectional line 5—5 in FIG. 4.
Figure 6:
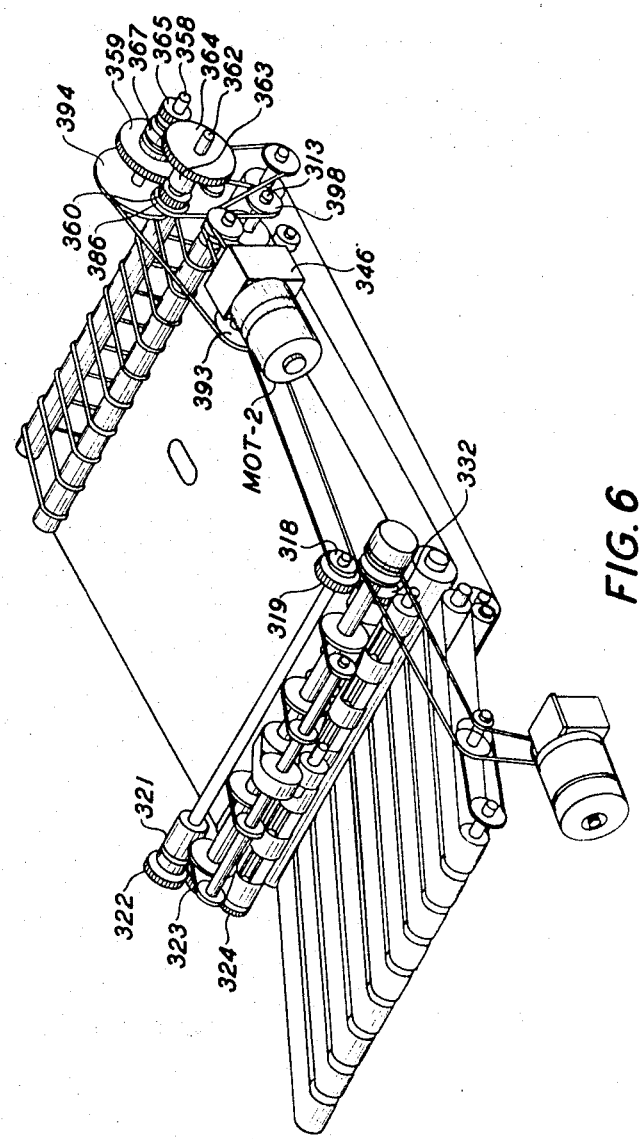
FIGURE 6 is a schematic presentation of the drive chain for the exposure transport.

Gear 324 drives a shaft 327 which is journaled at both ends to rotate in the side frames 328. Spaced along and fixed to this shaft and driven thereby are a plurality of segments 326 collectively referred to as the document registration gate. As seen in FIG. 5, a cross section of one of these segments shows each segment to be irregularly shaped to provide in the position shown in FIG. 5 an abutting surface 329 to effectively block the advancement of a sheet of material or document between the feed rollers 316 and the idler rollers 330 associated with each feed roller and separating each gate segment 326. In the position shown in FIG. 5, the document registration gate will be referred to as being in an up position. This up position may be altered upon the energization of the document gate solenoid in housing 331 which energizes the indexing clutch 321 to move the abutting surface of the registration gate so as to no longer block the advancement of a document. In this down position, a document will be free to pass through the path between and under the influence of the feed rollers and the idle rollers and onto the exposure transport belt 302. The idler rollers 330 are mounted on shaft 327 as are the segments of the document registration gate with the difference that the idler rollers are free to rotate in a friction drive relationship with the feed rollers.

The sprocket wheel 318 also provides driving power via gear 319 to the feed roller gear 332 which is fixed on shaft 325 to drive the feed rollers. The feed rollers and the power shaft 320 for the document registration gate will be rotating continuously when the machine is in operation through the motive power supplied by main sprocket wheel 393 referred to in FIG. 1.

The turn-around assembly 303 is located at the extremity of the exposure transport opposite the feed roller and registration gate. This assembly includes three friction driven rollers 333 which are driven with the exposure transport belt. One roller is spring loaded by springs 334 to tension a plurality of small belts 335 which move in a path to contact the three turn-around rollers and in cooperation with the exposure transport belt as it is in contact with conveyor roller 311. This tensioned roller 333 is also grooved to provide guides for each of the turn-around belts. The three turn-around rollers are rotatably mounted between two side plates 336 which, in turn, are supported by side frames 328. A support shaft 337 is pivotally mounted on these side frames 328 and extends through the two side plates of the turn-around assembly. This pivot relationship permits easy access to the interior of the turn-around assembly in case of the document jam or servicing of the detack corotron 304.

Within the path of the turn-around belts and closely adjacent the exposure transport belt as it is in contact with conveyor roller 311, there is positioned a detacking corotron 304. This corotron is mounted on a support rod which is fixed to the turn-around side plates 336.

The exposure transport belt 302 is under the influence of a vacuum during its travel through the exposure zone co-extensive with the ported vacuum manifold 315. This vacuum is provided by a suitable compressor (not shown) connected to the vacuum manifold through an appropriate exhaust duct 398.

Inside the vacuum manifold within the path of the exposure transport there are located two pair of photocells PC1–PC2, and PC3–PC4. Each pair of photocells are mounted on a plate 338 which is held in position by a positioning assembly 339. This assembly includes a positioning rod 340 which is frictionally driven by way of a small rubber O-ring 341 which is mounted on a rotatable screw shaft 342. This screw shaft may be actuated from outside of the vacuum manifold to move the photocells to any particular position within a certain predetermined range. Positioned immediately above each pair of photocells is an opening 343 in the vacuum manifold to render each pair of photocells accessible to light when the slot 345 in the exposure transport belt is over the opening in the vacuum manifold. The positioning assemblies 339 for these photocells are held stationary relative to the vacuum manifold and the openings 343 therein by a frame member 344 which is secured to the interior surface of the ported portion of the manifold.

Spaced adjacent from the exposure transport belt 302 as it contacts conveyor roller 312 and centrally with respect to the edges of the belt is a photocell assembly including a photocell PC9, referred to hereinafter as the slot sense photocell, which functions to monitor the reflections from the white or highly reflective surface of the exposure transport belt. In this manner, when the slot 345 in the exposure transport belt passes the slot sense photocell PC9, this photocell will detect a light-no light transition.

Figure 2:
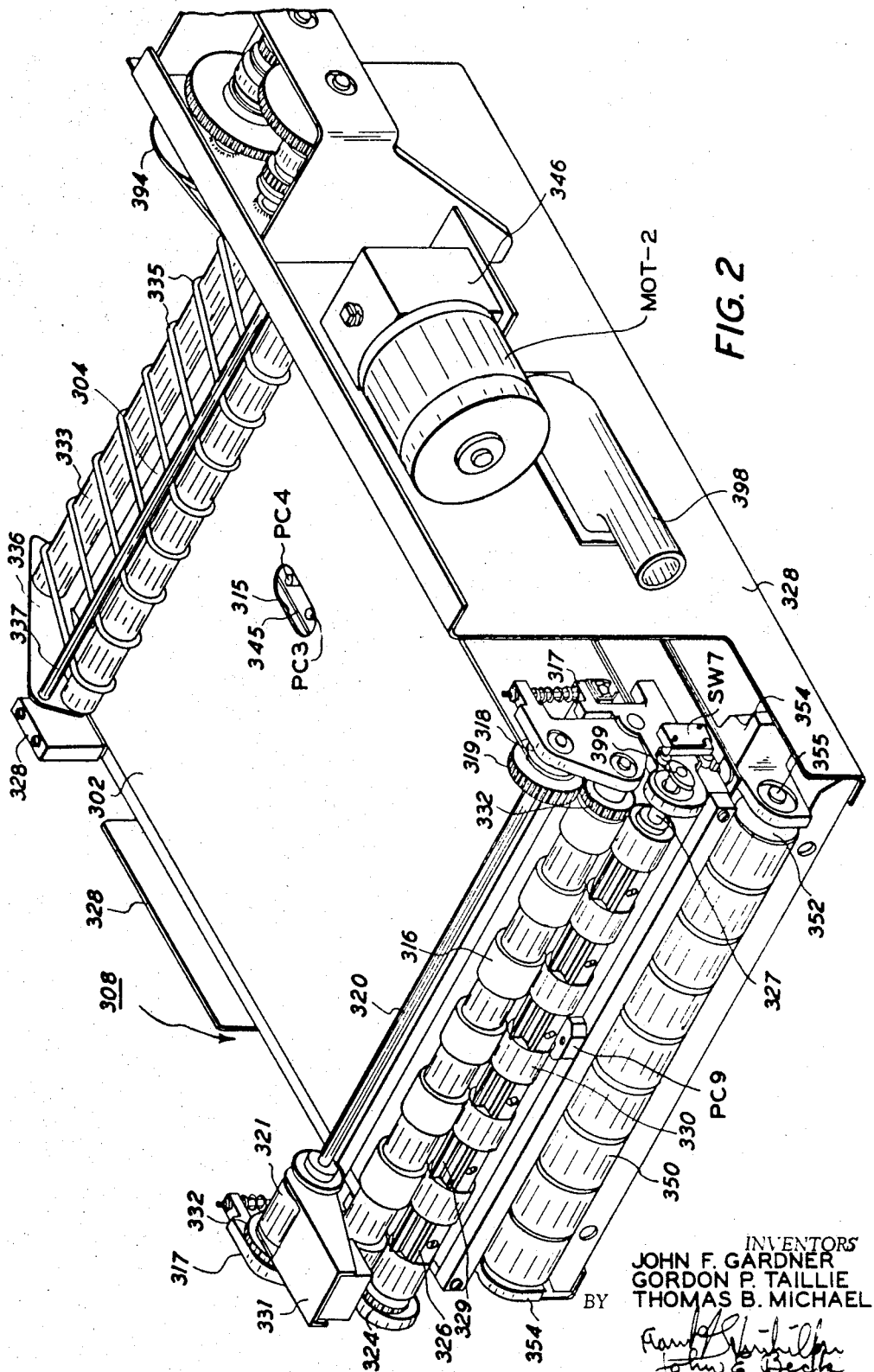
FIGURE 2 is a perspective view of the exposure transport and return transport in accordance with the present invention.
Figure 4:
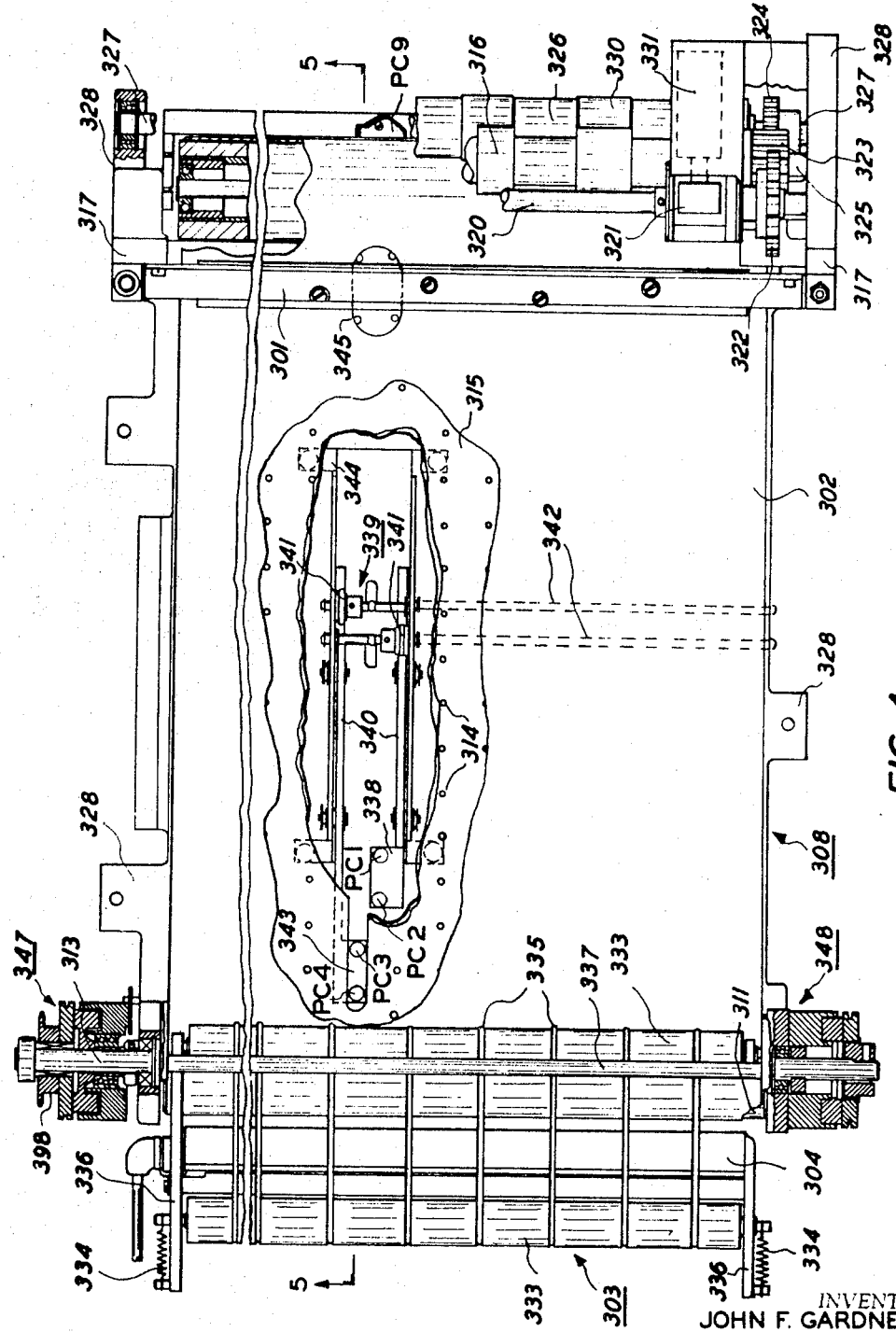
FIGURE 4 is a top view of the exposure transport.

Referring specifically to FIGS. 2 and 4, there is shown the main document transport motor MOT–2 mounted on side frame 328 which, via a suitable gear box 346, provides motive power to the main sprocket wheel 393 referred to previously in connection with FIG. 1. FIGURE 4 shows mounted on shaft 313 the exposure transport brake assembly generally designated 348.

Figure 3:
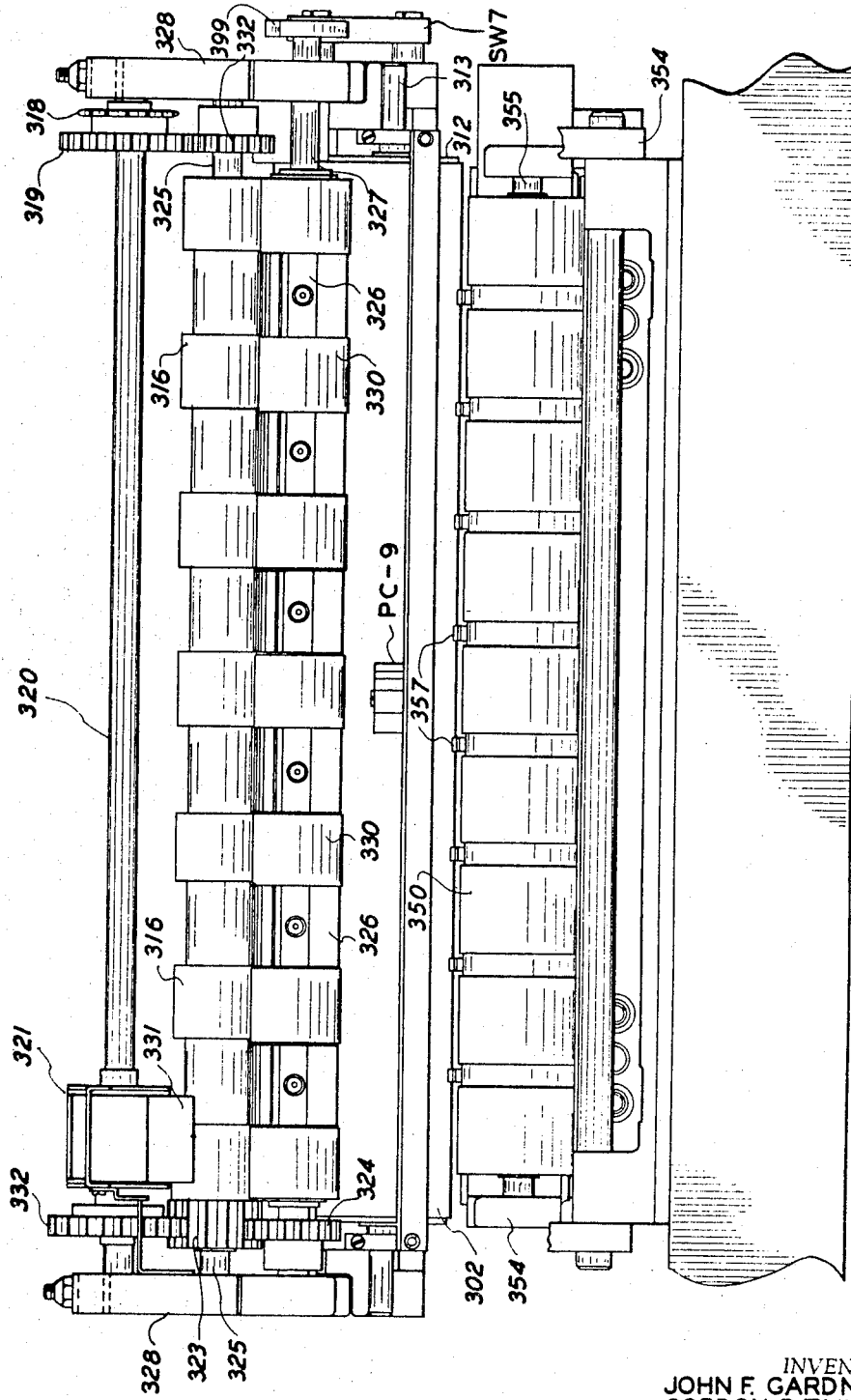
FIGURE 3 is an end view of the exposure and return transports showing the registration gate.

FIGURES 2 and 3 also show the document gate switch SW7 which is activated by cam 399 fixed to shaft 327. This cam turns with the document registration gate 326 to provide an electrical signal indicative of the position of the gate 326 and its abutting surface 329.

Referring now specifically to FIGS. 2, 3, and 5 the return transport will be described. This transport 305 is comprised of a plurality of belts 350 mounted on two conveyor rollers 351 and 352, roller 351 being continuously driven by a suitable sprocket wheel (not shown) mechanically coupled to the main transport drive motor MOT–2.

Inside the return trasport belts 350 and between conveyor rollers 351 and 352 there is mounted a vacuum manifold 353 which is attached to rigid member 354 which also supports the ends of shafts 355 of the conveyor rollers 351 and 352 on suitable bearings. The vacuum manifold 353 for the return transport has one surface thereof facing the exposure transport which has a plurality of ports 356 which are aligned in the spaces between adjacent return transport belts 350 to attract through suction the document being conveyed to these belts.

From the relationship between the return transport and the exposure transport and after the detacking operation in the turn-around assembly, a document previously copied will egress from the turn-around assembly and be attracted by the suction of the return transport and adhere to the constantly moving return transport belts 350. The direction of travel of this document will be opposite to the direction of the document movement in the exposure zone on the exposure transport and will exit from the return transport over a plurality of finger elements 357.

As the document leaves the return trasport and passes over the guide fingers 357, it will enter the influence of the stacker transport 306.

Referring now to FIGS. 1, 4, and 5, the drive system for the exposure transport will be described.

Gear box 346 translates power from the main transport drive motor MOT–2 to main sprocket wheel 393. This wheel is mechanically coupled via a drive chain to idler sprocket wheel 394 fixed to shaft 358. Also fixed to this shaft is large gear 359 which meshes with small gear 360 on shaft 362. This small gear 360 drives shaft 362 when the clutch 363 also on shaft 362 is energized. This clutch 363 will be referred to as the slow speed clutch hereinafter.

A second large gear 364 is also fixed on shaft 362 and will drive this shaft whenever it is driven by a second small gear 365. This small gear 365 receives motive power from shaft 358 when clutch 367 is energized. This clutch will be referred to hereinafter as the high speed clutch.

Fixed on shaft 362 is a sprocket wheel 386 which, via a drive chain, drives sprocket wheel 398 and shaft 313 fixed thereto. Shaft 313 is the drive shaft for conveyor roller 311 of the exposure transport 308.

With this arrangement of gears and clutches, the exposure trasport may be controlled to move at a high or slow speed depending on which of the two clutches 363 and 367 is energized. With high speed clutch 367 energized and slow speed clutch 363 de-energized, power from the main sprocket wheel 393 will be translated via sprocket wheel 394, shaft 358, and gears 359 and 386 to sprocket wheel 398 to rotate shaft 313 at a high speed. This may move the exposure trasport belt 302 at a speed of 15 inches per second, for example.

When the slow speed clutch is energized and the high speed clutch de-energized, power from sprocket wheel 393 will be translated to shaft 313 via engaged gear 365 and gear 362 to drive the exposure transport belt at a slower speed of 2 inches per second, for example.

To stop the exposure transport, both clutches are de-energized and brake 349 (FIG. 4) is energized.

Both clutches 363 and 367 and brake 348 are solenoid operated and are responsive therefore to suitable electrical signal conditions. The source of these signal conditions will be decribed with reference to FIG. 7.

Figure 7:
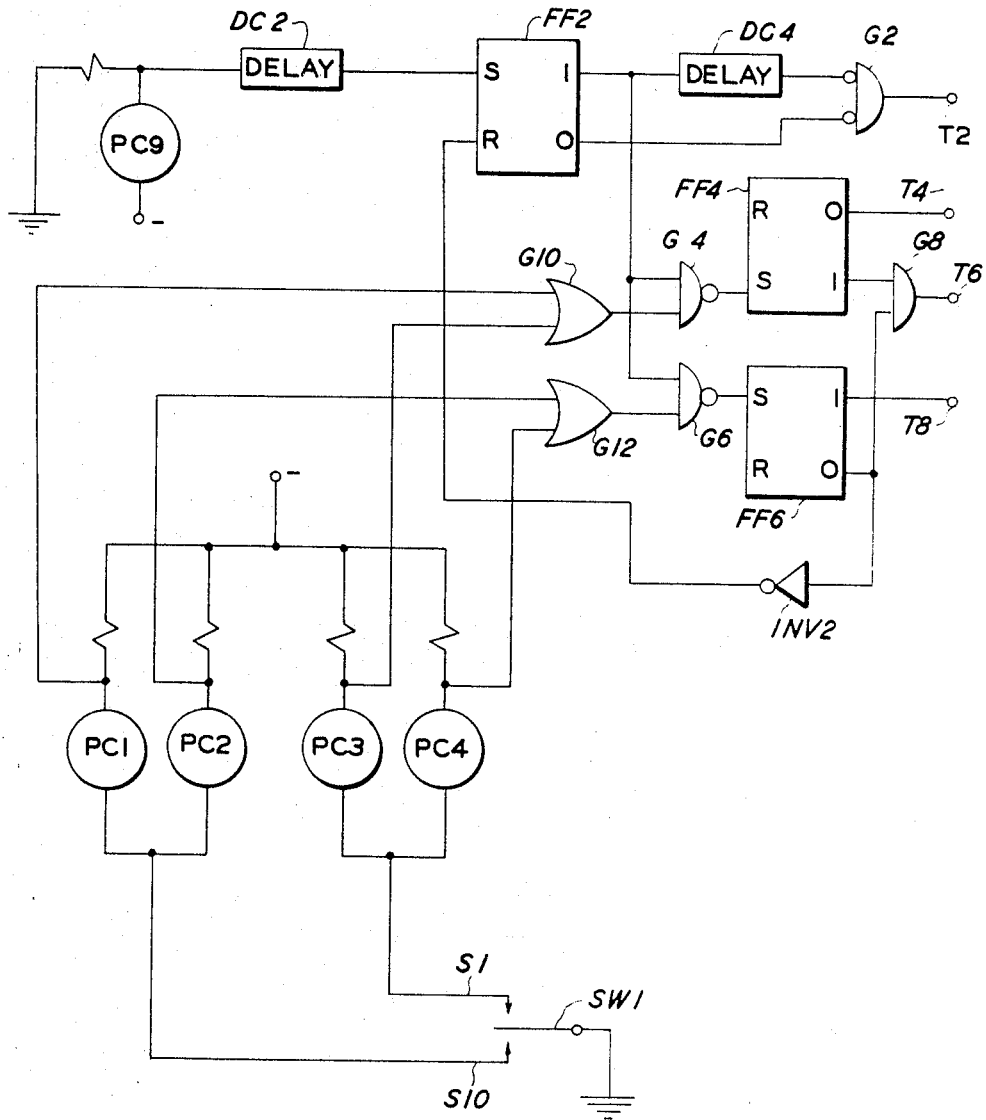
FIGURE 7 is a schematic of the exposure transport control circuit.

FIGURE 7 shows schematically how the exposure transport is controlled in accordance with the principles of the present invention to quickly and accurately advance a document to be copied to precise registration in an exposure zone where it may be flash illuminated. For purposes of this description, it will be assumed that a document to be copied is being held by the document registration gate 326 referred to previously in the description of FIGS. 1-5. This gate is controlled by an indexing clutch 321 which is energized or de-energized by a solenoid. This solenoid has its electrical input connected to output terminal T2 in the circuit of FIG. 7.

The solenoids which, in response to a certain signal condition, energize high and slow speed clutches 367 and 363 and transport brake 348 are connected to output terminals T4, T 6, and T8, respectively.

The operation of the circuit of FIG. 7 will now be described.

When a full sized original document is to be copied, switch SW1 is moved to contact terminal T1 which places an operating voltage across photocells PC3 and PC4. In the case of a small sized document, the arm of switch SW1 is placed in contact with terminal T10 to place this operating voltage across photocells PC1 and PC2. As noted in FIG. 4, the positions of these pairs of photocells permit registering a document to be copied in the center of the optical system of the reproducing apparatus in which the present invention may be utilized. These pairs of photocells are adjustable in position to allow reproduction of various size documents.

The outputs of photocells PC1 and PC3 are coupled to OR gate G10 while the outputs of photocells PC2 and PC4 are coupled to OR gate G12.

As noted previously, it will be assumed that a document to be copied is being held by the registration gate 326 out of influence of the feed roller 316. The exposure transport is in operation and slot 345 is advanced past slot sense photocell PC9 which detects the slot as an absence of light and provides a positive-going signal at the input of delay circuit DC2. After the elapse of this delay time, this positive-going signal sets flip-flop FF2. When flip-flop FF2 goes from a reset to a set condition, delay circuit DC4 in the one ouput of this flip-flop and AND gate G2 cooperate to provide a high level signal condition at output terminal T2 equal in duration to the time delay of circuit DC4. This high level signal condition energizes indexing clutch 321 to index the document registration gate 326 to its down position permitting the document to be copied to be drawn by the feed roller 316 and the idle roller 330 onto the exposure transport belt 302.

The delay of circuit DC2 is so chosen to insure that the document gate will not be released until the slot 345 is in such a position relative to the document to be copied as to permit this advancing document to bisect the slot rather than completely cover it.

From the preceding description of the slot sensor circuitry and the control of the document registration gate, the inter-relationship between the delay of circuit DC2, the position of slot sense photocell PC9, the speed of the exposure transport belt 302, the closest distance between the exposure transport belt and the output of the feed roller 316, and the conveying speed of the feed roller is of some significance. Each individual factor may be altered only with a compensating adjustment in one or more of the other factors.

With the factors mentioned in the preceding paragraph carefully selected, upon release of the document by the document gate the feed roller 316 will convey the document onto the exposure transport belt in such a manner that the belt slot 345 will be bisected by the lead edge of the document. This relationship between the lead edge and the slot will be maintained by the influence of the tacking corotron 301 as previously noted.

As the document now electrostatically adhering to the exposure belt 302 moves into the exposure zone a slow photocell PC3 previously alluded to in connection with FIG. 4 detects the change from light to dark and generates a signal which enables one input of NAND gate G4. The other input of the NAND gate, as well as one input of NAND gate G6, is connected to the one output of flip-flop FF2 and, while this flip-flop is in a set condition, is enabled. Therefore, the signal indicative of the passage of the lead edge covering a portion of the slot 345 in the exposure transport belt past slow photocell PC3 sets flip-flop FF4 disengaging the high speed exposure transport clutch 367 connected to output terminal T4.

The enabling of NAND gates G4 and G6 with the set condition of flip-flop FF2 insures that the slow photocell will only be able to slow down the speed of the document transport when a document is actually on the transport as signified by the set condition of flip-flop FF2. Otherwise, the slow photocell will detect the trailing edge of the belt slot 345 and slow the transport belt even if a document is not on the belt.

At this point, the exposure transport speed will be reduced from a relatively high speed, for example, 15 inches per second, to a slower speed, for example, 2 inches per second, under the influence of the slow speed clutch 363 connected to output terminal T6 associated with AND gate G8. This clutch is energized by the high level signal condition present at output terminal T6 connected to AND gate G8. This AND gate delivers a high level signal to terminal T6 when flip-flops FF4 and FF6 are set and reset, respectively. The document continues now at a slower speed in the exposure zone and approaches a stop photocell PC4.

Immediately upon the detection by the stop photocell PC4 of the lead edge of the document bisecting the slot. a signal is generated which enables a respective input of NAND gate G6 to effect the setting of flip-flop FF6. Upon the placing of flip-flop FF6 in its set condition, the slow speed clutch 363 connected to output terminal T6 is de-energized and the exposure transport brake 348 is energized thereby stopping the exposure transport with the document now properly and accurately registered in the exposure zone.

Also coincident with the setting of flip-flop FF6 is the resetting of flip-flop FF2, the reset input side of which is connected to the zero output of flip-flop via inverter INV2. The resetting of flip-flop FF2 inhibits NAND gates G4 and G6 and maintains the output at terminal T2 at a low level.

With the lead edge of the document now precisely positioned over the photocell PC4, the document is in exact registration with the optical system of the reproducing apparatus so that copies of the document may be made through flash exposure of the document.

The importance of the two speed transport may be appreciated when the inertia of the exposure transport is considered. At a high speed of 15 i.p.s., for example, accurate stopping of this transport is very difficult to maintain consistently. Therefore, very shortly before the exposure transport is to be stopped it is slowed down to a relatively slower speed of 2 i.p.s., for example. At this speed, the slow speed clutch may be de-energized and the transport brake applied to effectively stop the transport very accurately at the desired position indicated by where the stop photocell PC4 is located.

The transport may be restarted by placing flip-flops FF4 and FF6 in their initial reset conditions thereby engaging the high speed clutch. This may be done, for example, by suitable circuitry which detects when the number of desired copies of a document have been made.

While the invention has been described with reference to a specific system herein, it is not confined to the details set forth since it is apparent that other arrangements of the components may be made without departing from the scope of the invention.

Therefore, it is intended to cover such modifications or changes as may come within the scope of the invention as defined by the following claims.

What is claimed is:

1. A document transport system for transporting a document from a first position to a second position in an exposure zone at which it is held motionless, said transport comprising:
   (a) at least two roller members;
   (b) an endless transport belt entrained about said roller members and having at least one slot therein;
   (c) a source of motive power;
   (d) high speed clutch means coupled to said motive power source for driving said transport belt at a first speed when energized;
   (e) slow speed clutch means coupled to said motive power source for driving said transport belt at a second speed when energized, said first speed being substantially greater than said second speed;
   (f) document advancing means for advancing a document from said first position onto said transport belt such that said slot therein is bisected by the lead edge of said document;
   (g) a first photocell positioned between said roller members and fixed relative to said exposure zone to be struck by light when said slot is proximate to said first photocell;
   (h) a second photocell positioned between said roller members at said second position to be struck by light passing through said slot when it is proximate to said second photocell, said second photocell being spaced from said first photocell in the direction of movement of said belt in said exposure zone;
   (i) brake means associated with at least one of said roller members for stopping movement of said transport belt when energized;
   (j) first circuit means responsive to the detection of a light-no light transition by said first photocell for de-energizing said high speed clutch means and energizing said slow speed clutch means; and,
   (k) second circuit means responsive to the detection of a light-no light transition by said second photocell for de-energizing said slow speed clutch and energizing said brake means.

2. A document transport system as defined in claim 1 wherein said document advancing means includes:
   (a) a document registration gate means responsive to a gate release signal for advancing a document toward said transport belt;
   (b) a slot sense photocell positioned relative to said transport belt to detect the passage of said slot thereby;
   (c) third circuit means coupled to said slot sense photocell for generating a slot sense signal indicative of the passage of said slot past said slot sense photocell;
   (d) fourth circuit means responsive to said slot sense signal for generating said gate release signal;
   (e) means to couple said slot sense signal to said fourth circuit means.

3. A document transport system as defined in claim 2 wherein said first and second circuit means further include an inhibit circuit means responsive to the absence of said gate release signal for inhibiting said first and second circuit means.

4. A document transport system for accurately positioning a document on a moving transport belt comprising:
   (a) at least two roller members;
   (b) an endless transport belt entrained about said roller members and having at least one slot therein;
   (c) a source of motive power;
   (d) mechanical coupling means for coupling said source of motive power to at least one of said rollers members;
   (e) a slot sense photocell positioned relative to said transport belt to detect the passage of said slot thereby;
   (f) feed rollers positoned adjacent sad transport belt;
   (g) means for coupling said feed rollers to said source of motive power;
   (h) a document registration gate means having an up and down condition for preventing a document from advancing into the influence of said feed rollers when in said up condition and responsive to a gate release signal to go from said up condition to said down condition;
   (i) photocell circuit means coupled to said slot sense photocell for generating a slot sense signal indicative of the passage of said slot past said slot sense photocell;
   (j) release circuit means responsive to said slot sense signal for generating said gate release signal in time relation to the rate of movement of said transport belt whereby said document registration gate means goes to a down condition to permit a document to be advanced by said feed rollers such that the lead edge of said document bisects said slot on said transport belt.

5. A document transport system for accurately positioning a document on a moving transport belt comprising:
   (a) at least two roller members;
   (b) an endless transport belt entrained about said roller members and having at least one slot therein;
   (c) a source of motive power;
   (d) mechanical coupling means for coupling said source of motive power to at least one of said roller members;
   (e) a slot sense photocell positioned relative to said transport belt to detect the passage of said slot thereby;
   (f) photocell circuit means for generating a slot sense signal indicative of the detection of the passage of said slot by said slot sense photocell; and,
   (g) document advancing means responsive to said slot sense signal for advancing the lead edge of a document in bisecting relationship with said slot in said transport belt.

6. A document transport system for transporting a document from a first position to either a second or third position in an exposure zone at which it is held motionless, said transport comprising:
   (a) at least two roller members;
   (b) an endless transport belt entrained about said roller members and having at least one slot therein;
   (c) a source of motive power;
   (d) high speed clutch means coupled to said motive power source for driving said transport belt at a first speed when energized;
   (e) slow speed clutch means coupled to said motive power source for driving said transport belt at a second speed when energized, said first speed being substantially greater than said second speed;
   (f) brake means associated with at least one of said roller members for stopping movement of said transport belt when energized;
   (g) document advancing means for advancing a document from said first position onto said transport belt such that said slot therein is bisected by the lead edge of said document;
   (h) a first photocell positioned between said roller members and fixed relative to said exposure zone to be struck by light when said slot is proximate to said first photocell;

(i) a second photocell positioned between said roller members at said second position to be struck by light passing through said slot when it is proximate to said second photocell, said second photocell being spaced from said first photocell in the direction of movement of said belt in said exposure zone;

(j) a third photocell positioned between said roller members to be struck by light passing through said slot when said slot is proximate thereto;

(k) a fourth photocell positioned between said roller members at said third position to be struck by light passing through said slot when it is proximate thereto, said fourth photocell being spaced from said third photocell in the direction of movement of said belt in said exposure zone;

(l) first circuit means responsive to the detection of a light-no light transition by either said first or third photocell for de-energizing said high speed clutch means and energizing said slow speed clutch means;

(m) second circuit means responsive to the detection of a light-no light transition by either said second or said fourth photocell for de-energizing said slow speed clutch means and energizing said brake means; and, (n) switch means for selectively inhibiting said first and second photocells from detecting said light-no light transition in a first condition and for selectively inhibiting said third and fourth photocells from detecting said light-no light transition in a second condition.

7. A document transport system as defined in claim 6 wherein said document advancing means includes:

(a) feed rollers positioned adjacent said transport belt;
(b) coupling means for coupling said source of motive power to said feed rollers;
(c) document registration gate means for inhibiting advancement of a document to said feed rollers when said gate means is energized;
(d) a slot sense photocell means positioned relative to said transport belt for detecting passage of said slot thereby; and,
(e) third circuit means coupled to said slot sense photocell means for de-energizing said document registration gate means upon the detection of said slot by said slot sense photocell means.

8. A document transport system as defined in claim 6 wherein:

(a) said first and second photocells are fixed relative to each other;
(b) said third and fourth photocells are fixed relative to each other; and,
(c) means for selectively adjusting the position of said first and third photocells.

References Cited

UNITED STATES PATENTS

| | | | |
|---|---|---|---|
| 2,150,467 | 3/1939 | Stain | 250—223 X |
| 3,013,459 | 12/1961 | Coleman | 250—223 X |
| 3,322,961 | 6/1967 | Harrison et al. | |

OTHER REFERENCES

Scalone and Wheeler, "Incrementing Positioning Control Circuit," IBM Technical Disclosure Bulletin, vol. 6, No. 10, March 1964.

RALPH G. NILSON, Primary Examiner

C. M. LEEDOM, Assistant Examiner

U.S. Cl. X.R.

250—223; 271—47, 57